July 19, 1966 W. B. NORICK ETAL 3,261,613
HIGH PRESSURE FLUID SEALS
Filed May 13, 1965
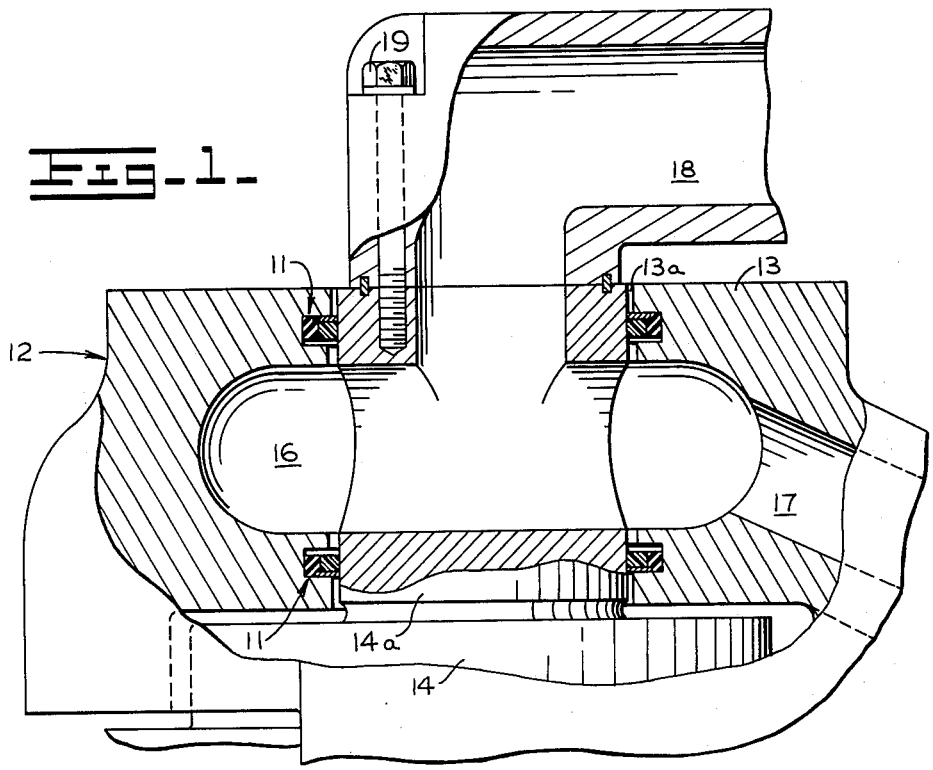
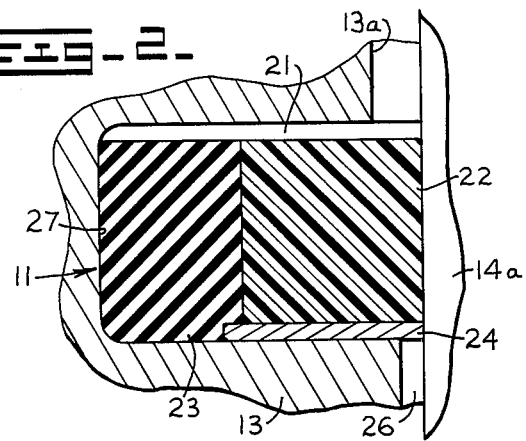
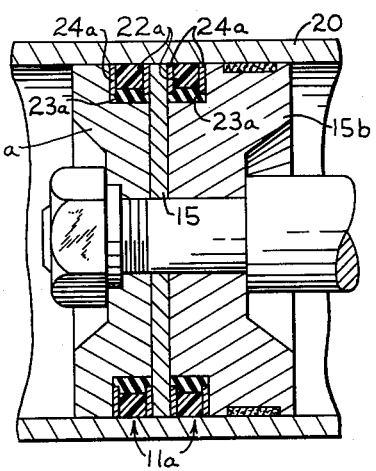
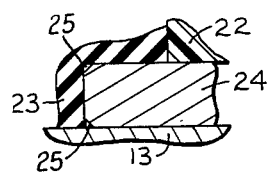
INVENTORS
WILLIAM B. NORICK
ROLLIN P. VAN ZANDT
BY JAMES M. KOSTAS
ATTORNEYS

3,261,613
HIGH PRESSURE FLUID SEALS
William B. Norick, Washington, and Rollin P. Van Zandt and James M. Kostas, Peoria, Ill., assignors to Caterpillar Tractor Co., Peoria, Ill., a corporation of California
Filed May 13, 1965, Ser. No. 455,531
3 Claims. (Cl. 277—176)

This is a continuation in part of assignees' copending patent application Serial No. 204,181, for "High Pressure Fluid Seals," filed June 21, 1962 which is now abandoned.

This invention relates to sealing devices and more particularly to seals for preventing the escape or passage of fluid under high pressure between relatively movable machine elements.

A problem generally unique to seals employed to prevent leakage of high pressure fluid is seal deterioration due to extrusion. Extrusion of a sealing member occurs when the clearance between the machine elements that the seal acts on is larger than a few thousandths of an inch. Clearance spaces of such dimensions may exist either by design or due to wear, but for the most part the space between machine elements which move relative to one another is greater than a few thousandths of an inch and thus gives rise to an extrusion problem when high pressure fluid is sealed. Once extrusion of the seal into the clearance space occurs, the seal quickly deteriorates and it is unable to furnish the service for which it was provided.

Because of the high pressure conditions which are contemplated by the present invention, the aforementioned problem is not solved by simply utilizing a sealing member constructed of a tough, low priction material such as polytetrafluoroethylene (commonly known and hereafter referred to for convenience as "Teflon"). Even Teflon with its excellent characteristics tends to extrude when fluid pressures much above 1000 p.s.i. are encountered, and the space being gapped is more than a few thousandths of an inch.

Accordingly, it is an object of the present invention to provide a high pressure sealing device of such construction as to prevent the extrusion of the sealing member and thereby eliminate failure therefrom.

It is another object of the present invention to provide a low friction, long lasting seal to prevent the leakage or escape of high pressure fluid from between machine elements which are relatively movable wherein a dimensionally stable member is provided in conjunction with the sealing member to prevent extrusion of the sealing member.

It is still a further object of the present invention to provide a sealing device having a metallic or other rigid back-up member which floats with respect to the movable machine element being sealed to effectively prevent extrusion of the sealing member where required clearances are great and even when the machine element carrying the back-up member is deflected due to concentrated loading.

Further and more specific objects and advantages of the invention are made apparent in the following specification wherein a preferred form of the invention is described by reference to the accompanying drawings.

In the drawings:

FIG. 1 is a partial sectional view of a rotary joint through which high pressure fluid passes and which employs a pair of seals to prevent fluid leakage;

FIG. 2 is an enlarged cross sectional view of one of the seals utilized with the rotary joint of FIG. 1;

FIG. 3 is a sectional view of a reciprocating piston with a seal of the present invention employed to prevent fluid leakage past the piston; and FIG. 4 is an enlargement of a portion of the back-up member illustrated in FIG. 2.

Referring now to FIG. 1, a pair of seals 11 are employed to prevent the leakage of oil from within a rotary joint, generally indicated at 12. The rotary joint comprises a rotatable or oscillating member 13 and a relatively stationary member 14. Member 14 has an extension 14a integral therewith which extends into a bore 13a in member 13. The size of bore 13a, with respect to extension 14a, is such that sufficient clearance exists between the two members to allow a certain amount of gyration between the elements. A toroidal chamber 16 defined by member 13 and extension 14a communicates through a passage 17 with a source of high pressure fluid (not shown), and a manifold 18 through which the fluid is delivered. Manifold 18 is secured as by cap screws, one of which is shown at 19, to member 14a. The seals 11 are placed on either side of toroidal chamber 16 so as to prevent leakage of fluid therefrom.

Referring now to FIG. 2, seal 11 is comprised of three annular members disposed within an annular groove 21 which is formed in member 13 so as to be coaxial with bore 13a. The seal comprises a contact member or sealing ring 22, a low pressure retaining ring member 23 surrounding sealing ring 22 and disposed in the back of groove 21, and a continuous annular back-up ring 24 disposed along the downstream or low pressure edge of member 22. Sealing ring 22 is most advantageously constructed of a material such as Teflon which has a low coefficient of friction as well as rugged wear characteristics. Ring 23, on the other hand, is best constructed of more elastic material such as rubber so arranged as to insure good sealing of the member 22 under low pressure conditions.

As best seen in FIG. 2 there exists between members 14a and 13 a clearance space 26 of sufficient size to make extrusion possible. To prevent extrusion of ring 22 from taking place annular back-up ring 24 formed from dimensionally stable material such as metal, is disposed at the downstream or low pressure side of the seal, and journalled approximately one to two thousandths of an inch radial free fit on extension 14a. In this manner, ring 24 prevents the extrusion of member 22 but does not cause a drag on rotating member 13. Annular ring 24 is also of such dimension that its outer radial surface is disposed inwardly from the bottom surface 27 of groove 21. This enables the back-up ring to move radially (which it can easily do against member 23) when there is gyration between elements 13 and 14. Since the high pressures exerted on the upper surfaces of the ring members 22 and 23 loads the ring 24 against the lower face of groove 21, as viewed in FIG. 2, its radially outer corners 25 are chamfered slightly (see FIG. 4) to prevent the ring 24 from gouging the sidewall of the groove 21. Any gouging at this point would increase the contact pressure between member 14a and ring 24 required to move the ring radially in groove 21. Although it is necessary that only the corner adjacent the sidewall of groove 21 be chamfered to allow ring 24 to float freely, chamfering of both of the radially outer corners permits the ring to be installed with either side thereof in contact with the side wall of the groove to avoid the danger of seal failure due to incorrect installation of the ring 24. In this manner back-up ring 24 is effectively floating so as to maintain the desired preventative against extrusion of member 22 no matter what the radial position of extension 14a. If member 24 were not floating, gyration of member 14a would cause seizing as well as possible concentrated wear on member 24 such that when the load was removed more than the allowable clearance would exist between the back-up member and the shaft 14a, thus allowing extrusion.

The continuous back-up ring 24 is a continuous cylindrical section which has no overlapping or butted together joints (beveled, step or other). This characteristic of ring 24 is of great importance to the present invention. It is the dimensional stability of ring 24 which compensates for the lack of dimensional stability in the gap 26 between the moving members. If ring 24 is subject to excessive deformation in response to the high pressure conditions which the seal experiences, it fails to provide the function for which it is designed. The continuous nature of ring 24 also makes it extremely easy to manufacture. The only critical dimension is that which mates with one of the machine elements and being circular in geometry there are no problems in achieving the required dimension. Since it is a continuous ring it will maintain its original dimensons during use. The spiral wound or abutted joint ring, on the other hand, will not rigidly maintain a given diameter because the ends are free to move. Precise control of the circumferential length of non-continuous rings as well as the diametral length are necessary to produce a good diametral fit with a mating element, but the end gap freedom permits excessive variation in ring diametral dimensions even if all due caution is used during manufacture. The end joint also introduces a potential area for extrusion of the seal.

Due to the advantage taken of the materials involved, the sealing device as shown in FIGS. 1 and 2 gives rise to an effective high pressure seal which can be made very small and still function properly. A seal of the type shown has been constructed so as to be effective against fluid pressures exceeding 5000 p.s.i. wherein the seal had an overall thickness (from upstream edge of sealing ring 22 to downstream edge of back-up member 24) of only ⅛ of an inch. The geometry and materials utilized in the seal assembly of the present invention enables the drag on member 13 to be reduced by more than a factor of ten as compared with known high pressure seals.

FIGS. 1 and 2 illustrate an arrangement wherein the seal 11 including ring 24 is carried in a closed groove in a one-piece member. In such instances the axial dimension of continuous ring 24 should be small enough relative to its radial width and diameter to permit elastic flexing thereof during assembly.

Referring now to FIG. 3, a piston comprised of a pair of piston sections 15a and 15b separated by a plate 15, is reciprocally disposed within a piston chamber 20. A seal 11a is disposed about each piston section adjacent plate 15 (which facilitates assembly of the piston seals) to prevent fluid from leaking past the piston. Each of seals 11a is very similar to seal 11 of FIGS. 1 and 2 in that they include a low pressure retaining ring member 23a and a sealing ring 22a circumjacent the deformable ring. Seals 11a, however, each employ a pair of continuous back-up rings 24a, one on either side of ring 22a. The necessity for two back-up rings 24a (as opposed to the single ring 24) arises from the fact that the pressure acting to extrude the sealing ring changes from one side of the ring to the other, each time the piston changes its travel from one direction to the other. In all other respects the seals operate in the manner described with reference to seal 11.

What is claimed is:

1. In a high pressure sealing device for use with a machine having high pressure fluid between two elements, one of which is movable with respect to the other, the combination comprising:

(1) a low friction, long wearing sealing ring disposed between the machine elements so as to be fixed with respect to one and in abutting contact with the other;

(2) an elastically deformable ring member circumjacent said sealing ring, said ring member operable to maintain said sealing ring in contact with the other of the machine elements even in the absence of high pressure fluid; and (3) a continuous back-up ring journalled to be disposed facially adjacent said sealing ring, said back-up ring having one of its peripheries circumjacent the machine element with which said sealing ring is in abutting contact at a sufficiently close distance to prevent extrusion of said sealing ring and having its opposite periphery disposed at a distance from the machine element with which said sealing ring is fixed, and supported by said deformable ring member so as to be free to float with the machine element with which said sealing ring is in abutting contact, said back-up ring being formed of a material which is dimensionally stable under high pressure conditions.

2. In a high pressure sealing device for use with a machine having high pressure fluid between two elements, one of which is movable with respect to the other, and the surface of one of said elements opposed to a surface of the other of said elements having a groove formed therein, the combination comprising:

(1) an elastically deformable ring member disposed in said groove;

(2) a low friction, long wearing sealing ring circumjacent said deformable ring member, said sealing ring being disposed partially in said groove and abutting said surface of said other element;

(3) a dimensionally stable, rigid back-up ring journalled to be disposed facially adjacent the down stream side of said groove and sealing ring, said back-up ring having one of its peripheries disposed sufficiently close to the surface of said other of said elements to prevent extrusion of said sealing ring and having its opposite periphery disposed at a distance from the bottom of said groove and supported by said deformable ring member so as to be free to float with said other of said elements, said back-up ring being continuous and having no overlapping, abutting or similar discontinuities in its structure.

3. In a high pressure sealing device for use with a machine having high pressure fluid between two elements, one of which is movable with respect to the other, the combination comprising:

(1) a low friction, long wearing sealing ring disposed between the machine element so as to be fixed with respect to one and in abutting contact with the other;

(2) an elastically deformable ring member circumjacent said sealing ring, said ring member operable to maintain said sealing ring in contact with the other of the machine elements even in the absence of high pressure fluid; and (3) a continuous back-up ring journalled to be disposed facially adjacent said sealing ring, said back-up ring having one of its peripheries circumjacent the machine element with which said sealing ring is in abutting contact at a sufficiently close distance to prevent extrusion of said sealing ring and having its opposite periphery disposed at a distance from the machine element with which said sealing ring is fixed and supported by said elastically deformable ring member so as to be free to float with the machine element with which said sealing ring is in abutting contact, said back-up ring being formed of a material which is dimensionally stable under high pressure conditions, and wherein the periphery of said back-up ring which is circumjacent the machine element with which said sealing ring is fixed is chamfered along at least one edge.

References Cited by the Examiner

UNITED STATES PATENTS

| | | | |
|---|---|---|---|
| 2,349,170 | 5/1944 | Jackman | 277—176 |
| 2,857,184 | 10/1958 | Mancusi | 277—165 |
| 2,862,736 | 12/1958 | Russell | 277—173 X |
| 2,877,070 | 3/1959 | Lee | 277—173 X |
| 2,935,365 | 5/1960 | Dega | 277—173 X |
| 2,973,978 | 3/1961 | Oppenheim | 277—188 |
| 3,088,759 | 5/1963 | Corsette | 277—188 X |

SAMUEL ROTHBERG, *Primary Examiner.*